(12) United States Patent
Thomsen

(10) Patent No.: US 8,397,576 B2
(45) Date of Patent: Mar. 19, 2013

(54) SENSOR AND METHOD FOR DETERMINING THE PRESSURE IN A FLUID

(75) Inventor: Knud Thomsen, Koblenz (CH)

(73) Assignee: Paul Scherrer Institut, Villigen PSI (CH)

( * ) Notice: Subject to any disclaimer, the term of this patent is extended or adjusted under 35 U.S.C. 154(b) by 408 days.

(21) Appl. No.: 12/866,761

(22) PCT Filed: Dec. 18, 2008

(86) PCT No.: PCT/EP2008/067897
§ 371 (c)(1),
(2), (4) Date: Aug. 9, 2010

(87) PCT Pub. No.: WO2009/097940
PCT Pub. Date: Aug. 13, 2009

(65) Prior Publication Data
US 2010/0319460 A1      Dec. 23, 2010

(30) Foreign Application Priority Data
Feb. 8, 2008   (EP) ..................................... 08002395

(51) Int. Cl.
*G01L 7/08*   (2006.01)

(52) U.S. Cl. .............................. 73/715; 73/708; 73/716

(58) Field of Classification Search ................... None
See application file for complete search history.

(56) References Cited

U.S. PATENT DOCUMENTS

| | | | |
|---|---|---|---|
| 5,437,189 A * | 8/1995 | Brown et al. ................... | 73/721 |
| 5,557,972 A | 9/1996 | Jacobs et al. | |
| 6,382,031 B1 | 5/2002 | Mast et al. | |
| 6,591,687 B1 * | 7/2003 | Bjoerkman et al. ............ | 73/724 |
| 7,140,085 B2 * | 11/2006 | Bjoerkman et al. ......... | 29/25.42 |
| 7,201,057 B2 * | 4/2007 | Agami ............................ | 73/708 |
| 7,270,009 B2 * | 9/2007 | Miyashita ...................... | 73/715 |
| 7,305,888 B2 * | 12/2007 | Walchli et al. .................. | 73/714 |
| 7,500,300 B2 * | 3/2009 | Walchli et al. ............. | 29/407.08 |
| 7,707,891 B2 * | 5/2010 | Antila et al. .................... | 73/714 |
| 7,946,178 B2 * | 5/2011 | Hanselmann et al. .......... | 73/706 |
| 2001/0025531 A1 | 10/2001 | Leung | |
| 2009/0320605 A1 * | 12/2009 | Antila et al. .................... | 73/718 |

* cited by examiner

*Primary Examiner* — Lisa Caputo
*Assistant Examiner* — Jermaine Jenkins
(74) *Attorney, Agent, or Firm* — Laurence A. Greenberg; Werner H. Stemer; Ralph E. Locher

(57) ABSTRACT

A pressure of a fluid is determined in a vacuum-tight welded housing containing a first membrane enclosing a part of a first inner volume and having a first contact area associated with a first temperature sensor and a heater. A second membrane opposite the first contact area also encloses part of the first inner volume and has a second contact area associated with a second temperature sensor. The first or second membrane is elastic around the contact area. The membranes hermetically seal a second inner volume at a reference pressure. The contact areas determine the mechanical and thermal contact due to the elasticity of one of the membranes when the first inner volume is connected to the fluid. When the volume is connected to the fluid F, the intensity and/or the time gradient of the heat transfer from the first to the second contact area is measured.

16 Claims, 1 Drawing Sheet

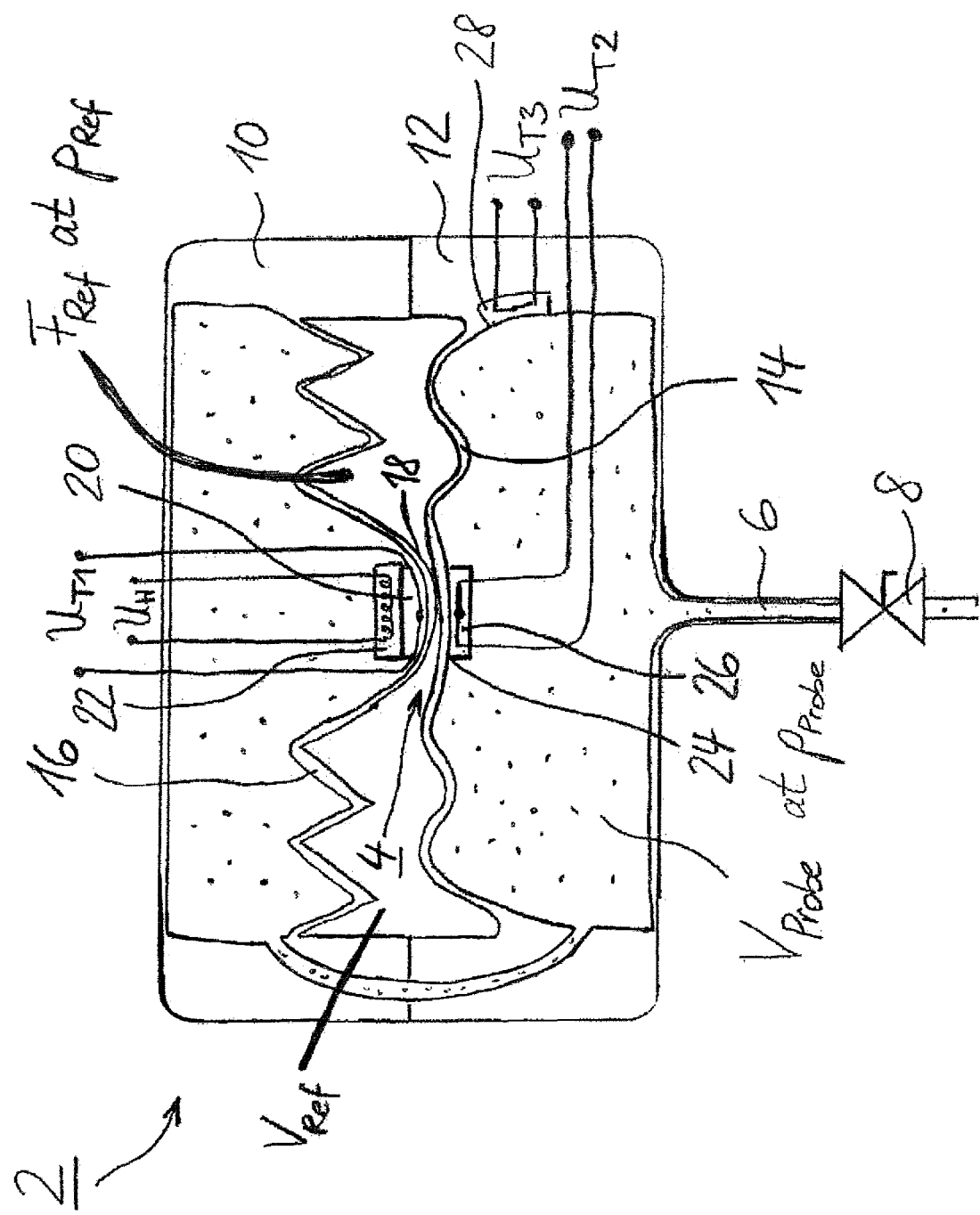

SENSOR AND METHOD FOR DETERMINING THE PRESSURE IN A FLUID

BACKGROUND OF THE INVENTION

Field of the Invention

The present invention relates to a sensor and a method for determining the pressure in a fluid.

The measurement of (gas) pressure in hostile environments, especially in strong radiation fields, is a common requirement at diverse experimental facilities and in industrial nuclear installations. There is not much choice in commercially available sensors and their prices are high.

In many industrial and scientific applications, the exact knowledge of the gas pressure of fluid associated with said application is crucial for the proper working of the applications and/or to the understanding of the processes performed within the applications. In some scientific experiments like during the irradiation of the liquid metal target Megapie in the PSI SINQ spallation source pressure has to be monitored. During Megapie operation the employed pressure sensors showed severe degradation while temperature sensors, i.e. thermocouple and PT100 sensors, exhibited good performance and stability.

One version of commercially available radiation resistant pressure sensors feature strain gauges, which i.e. are employed to measure the mechanical deformation of an evacuated and hermetically sealed container. One principle disadvantage of this design is linked to the intrinsic requirement to transfer mechanical deformation and shear-force via some non-metal insulation or bonding layer. In the end this layout probably also determines the limits for the allowed temperature range for these pressure gauges.

Another variant is based on capacitance sensing; for this, a trade-off between sensitivity and radiation resistance is unavoidable as locating the required sensitive measurement electronics further away to reduce radiation exposure leads to an increase in cable length and associated parasitic capacities.

BRIEF SUMMARY OF THE INVENTION

It is therefore the object of the present invention to provide a sensor and a method for determining the pressure of a fluid in a cost-effective and reliable way even under hostile environment, such as hard radiation environment.

These objectives are achieved according to the present invention by a sensor for determining a pressure of a fluid, comprising:
a) a vacuum tight welded housing;
b) the housing houses a first membrane enclosing a part of a first inner volume; said first membrane having a first contact area associated with a first temperature sensor and a heater;
c) the housing further houses a second membrane enclosing also a part of the first inner volume; said second membrane having a second contact area associated with a second temperature sensor and being disposed opposite to said first contact area, wherein at least one of said first membrane and said second membrane being elastic at least in a part of its respective contact area and/or around its respective contact area,
d) said first inner volume having an access to the fluid;
e) wherein the first and second membrane are designed in a way that they hermetically seal a second inner volume being held at a reference pressure, preferably being held under vacuum condition,
f) wherein the first and second contact areas touch each other at its respective default positions and wherein the first and second contact areas will determine the mechanical and thermal contact due to the elasticity of one of said first and said second membrane when the first inner volume is connected to the fluid, thereby enabling a stronger heat transfer from the first contact area to the second contact area due to the pressure of the fluid.

With respect to the method the afore-mentioned objectives are achieved according to the present invention by a method for determining a pressure of a fluid, comprising the steps of:
a) providing a vacuum tight welded housing;
b) providing within the housing a first membrane enclosing a part of a first inner volume; said first membrane having a first contact area associated with a first temperature sensor and a heater;
c) further providing within the housing a second membrane enclosing also a part of the first inner volume; said second membrane having a second contact area associated with a second temperature sensor and being disposed opposite to said first contact area, wherein at least one of said first membrane and said second membrane being elastic at least in part of its respective contact area and/or around its respective contact area,
d) providing an access of said first inner volume to the fluid;
e) designing the first and second membrane in a way that they hermetically seal a second inner volume being held at a reference pressure, preferably being held under vacuum condition,
f) wherein the first and second contact areas touch each other at its respective default positions and wherein the first and second contact areas will determine the mechanical and thermal contact due to the elasticity of one of said first and said second membrane when the first inner volume is connected to the fluid, thereby enabling a stronger heat transfer from the first contact area to the second contact area due to the pressure of the fluid;
g) connecting said first inner volume to the fluid, thereby enabling a heat transfer from the first contact area to the second contact area depending on the pressure of the fluid; and
h) measuring the intensity and/or the time gradient of the heat transfer from the first contact area to the second contact area.

Even when considering that the physical effect of heat transfer that forms the basis for the invented pressure gauge is well known, it has surprisingly not yet been used in this context before. The thermal contact resistance/conductance over a mechanical joint strongly depends on the applied pressure on the interface. In short, depending on material parameters like hardness, geometrical shape on a macro- and a micro scale, and other boundary conditions, an effective and radiation hard contact area can be established and depends on the pressure load giving rise to a contact conductance of a mechanical joint. As thermal conductance rises with the applied pressure the relations between contact pressure and resulting conductance even extending over several orders of magnitude can now easily be arranged.

In one preferred embodiment of the present invention the temperature gradient is measured over the first temperature sensor and the second temperature sensor; said temperature gradient being representative for the pressure in the fluid. As mentioned above the grade of the gradient can be chosen in a wide range to cover the desired measure accuracy. A further gain in accuracy can be achieved according to a further preferred embodiment that uses the temperature gradient measured over the first temperature sensor and the second temperature sensor and uses the time gradient of the temperature gradient which both are in the right combination representative for the pressure in the fluid.

Furthermore, i.e. to allow for a cross-check of the determined pressure results, in another preferred embodiment of the present invention, a third temperature sensor associated with the second membrane can be disposed at a predetermined distance from the second temperature sensor, preferably close or at the housing. This measure then also allows to check the observed temperature distribution over the device for consistency, i.e. allowing a validation of the signals.

One further preferred embodiment of the present invention provides the first and the second membrane being made from a metallic material having poor thermal conductivity. This poor thermal conductivity allows to observe the heat transfer at a moderate rate in order to compare the measure gradient to the reference data. In other words, the less conductivity the membrane has within a certain thermal conductivity range the better is the "signal-noise-ration" achieved to determine the pressure.

In order to avoid a heat transfer from heat radiation absorption the first and the second membrane may comprise at least partially a surface being polished for reducing the heat radiation absorption.

Further preferred embodiments of the present invention can be taken from the remaining depending claims.

BRIEF DESCRIPTION OF THE DRAWING

Preferred examples of the present invention are hereinafter described with respect to the attached drawing. This FIGURE illustrates a sketch of a cross-sectional view on a sensor for measuring the pressure in a fluid.

DESCRIPTION OF THE INVENTION

The basic functional principle of the new radiation resistant sensor 2 is based on a one-sided heating at a mechanical interface 4 and accompanying measurement of a number of temperatures over the interface 4 as well as its surrounding, the thermal impedance can be determined. Following a suitable calibration of the sensor 2 an applied gas pressure $p_{Probe}$ of a probe fluid $F_{Probe}$ can be inferred. In the FIGURE, the reference numbers show at:

6 gas connection between a probe volume $V_{Probe}$ in the sensor 2;
8 a controllable valve;
10, 12 a sensor housing in two parts, vacuum tight welded, i.e. by e-beam welding, enclosing a volume $V_{Ref}$ with a reference fluid $F_{Ref}$ at a reference pressure $p_{Ref}$;
14 a first membrane (soft as an example in the sketch), polished and having low thermal conductivity;
16 a second membrane (hard as an example in the sketch), polished and having low thermal conductivity;
18 a first contact area with a first temperature sensor 20 and an electrical heater 22;
24 a second contact area with a second temperature sensor 26;

When no pressure is applied (default situation as shown in the FIGURE) the first membrane 14 and the second membrane 16 with their respective contact points areas 18, 24 touch slightly. Heating with the heater 22 causes a local rise in temperature over the first contact area 18. With its hard supporting membrane 16 made of material with low thermal conductivity a significant temperature gradient to the housing 10, 12 and to the soft membrane 14 can be assured. Both membranes 14, 16 are polished to limit a radiative heat transfer.

Applying the gas pressure of the probe fluid $F_{Probe}$ through the gas connection 6 by opening the valve 8 causes the first membrane 14 to deflect and make mechanical and thermal contact at its contact area 24 with the contact area 18 of the second membrane 16. Depending on the magnitude of the ensuing contact pressure $p_{Probe}$ a thermal link via conductance over the interface 4 is established. As a consequence temperatures changing over the time are measured using sensors such a thermo couples or Pt100, associated with each temperature sensor 20, 26. In particular, the temperature difference between the contact areas 18, 26 is decreased.

Knowing the thermal conductance over the interface 4 in dependence of the applied pressure from a previous calibration step, it is easy to determine the applied probe pressure $p_{Probe}$ from the measured temperatures and the known heating power. Of course, by selecting specific features and parameters for embodiments the use of such a sensor 2 in a wide range of pressures and temperatures is made possible.

In the following some educated proposals concerning diverse details to be considered during the design like choosing materials and geometries are presented. They are meant as starting point for an initial embodiment. Depending on the intended use, i.e. pressure range, temperature limits as well as accuracy and price trade-offs, detailed test are required which are considered to range in the daily routine of a person skilled in the art.

A possible material appears to be the alloy Ti-6% Al-4% V (grade5, IMI318). This alloy features very low thermal conductivity (~6 W/mK), low thermal expansion (~5×10$^{-6}$/K), high surface hardness, high strength, and excellent chemical inertness at the same time. It is possible to finely machine this material, weld it using electron beam welding, use it without surface treatment as well as also coat it in order to tailor its surface properties like enhancing its wear resistance, hardness and corrosion resistance markedly. Stainless steel 316 with proper surface finishing and a hard coating like Kolsterizing is also a material suitable and sufficient for many applications.

In principal, both thermocouples and resistors like Pt100 could be used to measure temperatures and could be also used to work as heaters (intermittently, not shown in the FIGURE). To minimize interfaces and potentially unreliable contacts it should be considered to use the membrane material itself as one conductor in thermocouples. Spot welding a wire of a suitable, different, metal could be all that is needed, both, to heat the contact point by applying some current and also to measure a well defined temperature by sensing the thermo voltage between the wire and the housing 10, 12 of the sensor 2.

In any case, the chosen heating power has to be adapted to the intended use of the pressure sensor 2. The involved trade-offs are not too complicated, e.g. high heating power gives large temperature readings, seemingly allowing for higher accuracy, but possibly disturbs the delicate geometry via thermal expansion at the contact areas and also enhances the effectiveness of unwanted (non-linear) heat transfer through the gas or via radiation.

Theories often distinguish between small scale and large scale contributions to the overall thermal conductance over a mechanical connection. The first is associated with micro hardness of the involved materials of which the softer one determines the behavior, harder materials yield lower conductance. On the macro scale the fitting (e.g. flatness) of the contact areas 18, 24 determines its thermal resistance. In any case, it can be assumed that contact is made at a limited number of local points. The harder the material(s) and the larger the deviation from a perfectly fitting shape, the lower the thermal conductivity over a joint will be at low pressure. This dependence can be used when selecting/optimizing the performance of the pressure sensor 2. Whereas it appears to be obvious that harder surfaces, especially ones that do not permanently change their form under the intended load, are advantageous, it is not mandatory that perfect flat contact areas are beneficial. Some well defined initial non-flat surfaces could be made to deflect under pressure and thus increase the effective contact area as compared to a very stiff geometry. This could be employed to expand or tailor the sensing range of the pressure sensor 2.

Many different detailed designs are possible with respect to the geometry of the membranes 14, 16 carrying the contact areas 18, 24. The two membranes 14, 16 can either be of the same stiffness or one could be flexible and the other one relatively stiff. Rigid membranes can be designed to transfer and concentrate the gas pressure applied to the whole membrane area to the contact area (like a loud speaker cone with soft hinge) or in such a way that a considerable fraction of the force is required to deflect the contact point(s) at all.

Whatever the exact shape or stiffness of the membranes, it might be best to apply the pressure to both of them simultaneously. This would be easy with a gas connection in the housing which connects the two sides of the gage. Such a symmetric design could be used for measuring absolute pressure (with the volume between the membranes evacuated) or relative pressure (with the reference pressure connected to the volume enclosed between the membranes).

A basic symmetrical layout brings an inherent advantage of the whole basic approach to the surface: an efficient self-check of such pressure sensors is easily possible. Recording three or more temperatures (i.e. at the contact points and at the housing), it is straight forward to check their overall consistency. This goes beyond what is possible with other pressure gages, where redundancy can guarantee that only consistent readings are accepted as valid, but where it is not directly possible to determine which sensor is broken (and not at all from one device only).

Deviations from (existing) theoretical models and thus potential measurement errors are expected to be reproducible and thus it should be possible to keep them at bay by careful calibration.

Models of thermal conductivity over mechanical joints as reported in the literature need some validation of their applicability for the here described use: people are usually concerned with "good" contacts, meaning little and stable thermal resistance in mechanical connections at high loads. For this purpose sometimes soft fillers are used to enhance thermal contacts. This not exactly what is demanded for the repeated and reproducible operation of pressure sensors.

All of the above assumes that gas pressures are low enough for allowing heat transfer through the gas to be neglected. If this is not the case in a specific application it is always possible to calibrate a sensor with the correct gas for the selected pressure range.

For measuring pressure in liquids, heat transfer via the fluid would in most cases have a considerable influence on the obtained readings. It appears to be possible to make sure with the geometrical design that also in gages for use with liquids no liquid enters the sensor volume proper, but rather that the pressure is transferred only via some captured gas cushion to the membrane(s).

It is envisioned that the here described radiation resistant pressure sensor 2 can deliver accurate measurements in very harsh radiation environments. Featuring an (almost) all-metal design such sensors can furthermore be employed advantageously also at very high operating temperatures. The instrumentation of experimental facilities like the SINQ neutron spallation source, especially with a liquid metal target like Megapie, would benefit considerably. In a wider context, any kind of nuclear environment like at commercial power plants should be interested in a novel diverse sensor with a maximum resistance to ionizing radiation and heat.

The invention claimed is:

1. A sensor for determining a pressure of a fluid comprising:
    a) a vacuum tight welded housing;
    b) a first membrane disposed in said housing, said first membrane enclosing a part of a first inner volume, and said first membrane having a first contact area associated with a first temperature sensor and a heater;
    c) a second membrane disposed in said housing, said second membrane enclosing a part of said first inner volume, and said second membrane having a second contact area associated with a second temperature sensor and being disposed opposite said first contact area, wherein at least one of said first membrane and said second membrane are elastic at least in part of the respective said contact area and/or around the respective said contact area;
    d) said first inner volume being formed with an access for the fluid;
    e) said first and second membranes hermetically sealing a second inner volume being held at a reference pressure;
    f) said first and second contact areas touching each other at respective default positions and said first and second contact areas determine the mechanical and thermal contact due to the elasticity of one of said first and said second membranes when said first inner volume is connected to the fluid, thereby enabling a stronger heat transfer from said first contact area to said second contact area due to the pressure of the fluid.

2. The sensor according to claim 1, wherein said second inner volume is held under vacuum condition.

3. The sensor according to claim 1, wherein a temperature gradient is measured over the first temperature sensor and the second temperature sensor and the temperature gradient is representative of the pressure in the fluid.

4. The sensor according to claim 1, wherein the temperature gradient measured over the first temperature sensor and the second temperature sensor and the time gradient of the temperature gradient are representative for the pressure in the fluid.

5. The sensor according to claim 1, which further comprises a third temperature sensor associated with said second membrane and disposed at a predetermined spacing distance from said second temperature sensor.

6. The sensor according to claim 5, wherein said third temperature sensor is disposed in a close vicinity of or at said housing.

7. The sensor according to claim 1, wherein said first and second membranes are made from a metallic material having poor thermal conductivity.

8. The sensor according to claim 7, wherein said first and second membranes comprise at least partially a surface being polished for reducing a heat radiation absorption.

9. A method of determining a pressure of a fluid, the method which comprises:
    a) providing a vacuum-tight welded housing;
    b) providing within the housing a first membrane enclosing a part of a first inner volume, the first membrane having a first contact area associated with a first temperature sensor and a heater;
    c) providing within the housing a second membrane enclosing also a part of the first inner volume, the second membrane having a second contact area associated with a second temperature sensor and being disposed opposite the first contact area, wherein at least one of the first membrane and the second membrane is elastic at least in part of its respective contact area and/or around its respective contact area;
d) providing an access for the fluid to the first inner volume;
e) forming the first and second membranes to hermetically seal a second inner volume being held at a reference pressure;
f) wherein the first and second contact areas touch each other at respective default positions and wherein the first and second contact areas determine the mechanical and thermal contact due to the elasticity of one of the first and second membranes when the first inner volume is connected to the fluid, thereby enabling a stronger heat transfer from the first contact area to the second contact area due to the pressure of the fluid;
g) connecting the first inner volume to the fluid, thereby enabling a heat transfer from the first contact area to the second contact area in dependence on the pressure of the fluid; and
h) measuring at least one of an intensity and a time gradient of the heat transfer from the first contact area to the second contact area and deducing therefrom the pressure of the fluid.

10. The method according to claim 9, which comprises holding the second inner volume under vacuum condition.

11. The method according to claim 9, which comprises measuring the temperature gradient over the first temperature sensor and the second temperature sensor, the temperature gradient being representative of the pressure in the fluid.

12. The method according to claim 9, which comprises measuring the temperature gradient over the first temperature sensor and the second temperature sensor and measuring the time gradient of the temperature gradient, and wherein the temperature gradient and the time gradient of the temperature gradient are representative of the pressure in the fluid.

13. The method according to claim 9, which comprises providing at least one third temperature sensor associated with the second membrane and placing the third temperature sensor at predetermined distance from the second temperature sensor.

14. The method according to claim 13, which comprises placing the third temperature sensor in close vicinity of or at the housing.

15. The method according to claim 9, wherein the first membrane and the second membrane are made from a metallic material having poor thermal conductivity.

16. The method according to claim 15, wherein the first and second membranes comprise an at least partially polished surface for reducing a degree of heat radiation absorption.

* * * * *